R. A. CAMPBELL.
TIRE STEM CAP.
APPLICATION FILED MAY 31, 1918.

1,309,795.

Patented July 15, 1919.

WITNESSES

INVENTOR
Robert A Campbell

UNITED STATES PATENT OFFICE.

ROBERT A. CAMPBELL, OF MINNEAPOLIS, MINNESOTA.

TIRE-STEM CAP.

1,309,795.  Specification of Letters Patent.  Patented July 15, 1919.

Application filed May 31, 1918. Serial No. 237,490.

*To all whom it may concern:*

Be it known that I, ROBERT A. CAMPBELL, a citizen of the United States, resident of Minneapolis, county of Hennepin, State of Minnesota, have invented certain new and useful Improvements in Tire-Stem Caps, of which the following is a specification.

The object of my invention is to provide an attachment for a pneumatic tire stem, which will enable the user to easily and quickly uncover the end of the tire stem and as easily and quickly recover it.

A further object is to provide an air tight cover for the end of the tire stem and a dust and moisture excluding cover to protect the rest of the exposed portion of the tire stem.

A further object is to provide a well finished, complete instrument that can be adjusted to fit any tire stem, and that can perform the function of a cap, dust cover, and rim nut.

Other objects of the invention will appear from the following detailed description.

The invention consists generally in various constructions and combinations, all as hereinafter described and particularly pointed out in the claims.

In the accompanying drawings forming part of this specification,

Figures 1, 2, 3:
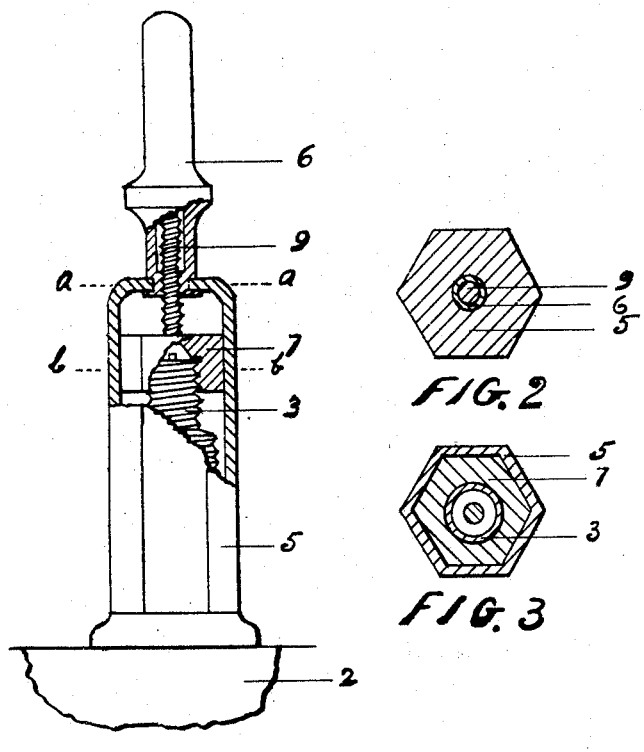
Figure 1 is a detailed sectional view of a tire stem and cap therefor.
Fig. 2 is a cross section on *a—a* of Fig. 1.
Fig. 3 is a cross section on *b—b* of Fig. 1.

In the drawings, 2 represents the wheel rim and 3 a tire stem.

A cap 7, having an exterior surface polygonal in cross section, and an exteriorly threaded extension 9, is interiorly threaded to engage the threads on the tire stem, and is provided with an interior shoulder and gasket for making an air-tight joint with the end of the tire stem.

Slidable longitudinally upon the external surface of cap 7 is a dust cover 5 having an inner surface of which the cross section is a polygon similar to that of the cross section of the outer surface of cap 7. At the upper end of the dust cover is a circular opening to receive a swivel on the lower end of an extension cover 6.

One of the functions of dust cover 5 is to turn cap 7 on or off the tire stem.

The extension cover 6 is internally threaded at its lower end to fit threads on extension 9, and is swiveled in the opening of the upper end of dust cover 5.

By turning extension cover 6, when cap 7 is in place upon the tire stem, movement of dust cover 5 up or down along cap 7 is produced. The dust cover 5 may thus be made to press upon the wheel felly and produce a dust and moisture proof joint therewith, also a frictional engagement therewith which latter aids in holding the instrument securely in place.

Reversing the turning movement of extension cover 6 releases the dust cover 5 from its frictional engagement with the wheel felly so that dust cover 5 may be easily made to unscrew cap 7 from the tire stem.

Experiments with this instrument prove it to be a valuable, practical, convenient and time saving invention.

Various forms, modifications, and adaptations of this improvement may be made and come within the scope of this invention.

I claim as my invention.

1. The combination with a tire stem of a cap, a dust cover, means for turning said cap and said dust cover together and means including a swiveled joint for producing longitudinal movement of said dust cover upon said cap.

2. The combination with a tire stem of a dust cover, a cap, and a casing swiveled at the upper end of said dust cover, said casing having means for producing longitudinal movement of said dust cover relative to said cap.

3. The combination with a tube of a cap designed to cover the opening at the end of said tube, a covering for said tube, said covering having means for applying said cap to said tube, and means including a swiveled joint for producing longitudinal movement of said cover relative to said tube.

4. The combination with a tube of a cap designed to close the end of said tube, a covering for said tube, said covering for said tube having an opening at its upper end, and means, having a swivel joint in said opening, for producing longitudinal movement of said covering relative to said cap.

5. The combination with a tire stem of a dust cover, a cap having an externally threaded extension passing through an opening in the dust cover, a casing for said extension having a bearing upon said dust cover, an internally threaded tubular projection of said casing extending through the opening in said dust cover, and a shoulder on said tubular projection having a bearing upon the inner surface of said dust cover.

6. The combination with a tire stem, of a dust cover, a tire stem cap having an extension, a casing for said extension, means for producing longitudinal motion and preventing rotary motion of said dust cover in relation to said cap, and means for producing rotary motion and preventing longitudinal motion of said casing in relation to said dust cover.

ROBERT A. CAMPBELL.

Witnesses:
 TOLDA HAGEN,
 BERNICE M. COLE.